(12) United States Patent
Arnone et al.

(10) Patent No.: US 7,877,252 B2
(45) Date of Patent: Jan. 25, 2011

(54) AUTOMATIC SPEECH RECOGNITION METHOD AND APPARATUS, USING NON-LINEAR ENVELOPE DETECTION OF SIGNAL POWER SPECTRA

(75) Inventors: Luigi Arnone, Agrate Brianza (IT); Alberto Amilcare Savi, San Donato Milanese (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 896 days.

(21) Appl. No.: 11/750,771

(22) Filed: May 18, 2007

(65) Prior Publication Data

US 2008/0288253 A1    Nov. 20, 2008

(51) Int. Cl.
*G10L 19/14*    (2006.01)
*G10L 15/00*    (2006.01)

(52) U.S. Cl. ...................... 704/205; 704/231
(58) Field of Classification Search ................. None
See application file for complete search history.

(56) References Cited

U.S. PATENT DOCUMENTS

| | | | | |
|---|---|---|---|---|
| 5,485,543 | A * | 1/1996 | Aso | 704/267 |
| 7,016,839 | B2 * | 3/2006 | Dharanipragada et al. | 704/245 |
| 7,337,107 | B2 * | 2/2008 | Rose et al. | 704/208 |
| 7,636,659 | B1 * | 12/2009 | Athineos et al. | 704/205 |

OTHER PUBLICATIONS

Zhu et al., "Amplitude Demodulation of Speech Spectra and its Application to Noise Robust Speech Recognition," 6th International Conference on Spoken Language Processing (ICSLP) 2000. vol. 1, pp. 341-344. Oct. 2000.*

Wolfel, "Warped and Warped-Twice MVDR Spectral Estimation With and Without Filterbanks", Lecture Notes in Computer Science, vol. 4299, pp. 265-274, 2006.*

Giuliani, D. et al., "Experiments of Speech Recognition in a Noisy and Reverberant Environment using a Microphone Array and HMM Adaption," Proceedings of the Fourth International Conference on Spoken Language, Philadelphia, PA, Oct. 3-6, 1996, pp. 1329-3332.

Zhu, Q. et al., "Non-linear feature extraction for robust speech recognition in stationary and non-stationary noise," Computer Speech and Language, vol. 17, 2003, pp. 381-402.

* cited by examiner

*Primary Examiner*—Brian L Albertalli
(74) *Attorney, Agent, or Firm*—Lisa K. Jorgenson; Robert Iannucci; Seed IP Law Group PLLC (57) ABSTRACT

An automatic speech recognition method includes converting an acoustic signal into a digital signal; determine a power spectrum of at least one portion of the digital signal; and non-linearly determining envelope values of the power spectrum at a plurality of respective frequencies, based on a combination of the power spectrum with a filter function. Non-linearly determining envelope values involves calculating each envelope value based on a respective number of values of the power spectrum and of the filter function and the respective number of values is correlated to the respective frequency of the envelope value.

28 Claims, 5 Drawing Sheets

AUTOMATIC SPEECH RECOGNITION METHOD AND APPARATUS, USING NON-LINEAR ENVELOPE DETECTION OF SIGNAL POWER SPECTRA

BACKGROUND OF THE INVENTION

1. Field of the Invention

The present invention relates to an automatic speech recognition method and to an automatic speech recognition apparatus, using non-linear envelope detection of signal power spectra.

2. Description of the Related Art

Automatic Speech Recognition (ASR) systems are designed to automatically associate words selected from a given dictionary to acoustic speech signals generated by either a human or a synthetic speaker. ASR systems are normally provided with equipment to process speech signals by performing so-called front-end steps and back-end steps.

Front-end processing generally includes speech signal detection and extraction of features on which recognition is to be based. In back-end processing, extracted features are compared to speech patterns and, based on decision rules, words are associated with detected speech signals.

Due to learning capability and training, ASR systems can be adapted to operate in specific configurations, e.g., with specific sets of acoustic sensors or in specific environmental conditions. Quite high rates of correctly recognized words may be thus achieved in the absence of interferences.

However, an acoustic sensor may show an ill-behaved frequency response and noise sources may be present, such as voiced or unvoiced noises, echoes and reverberations. These and other similar conditions may seriously affect the performance of ASR system.

Front-end and back-end techniques have been proposed to reduce sensitivity of ASR systems to interferences. Back-end techniques aim at providing robust characterization of an acoustic model and include model adaptation techniques (such as Maximum Likelihood Linear Regression or Maximum A Posteriori Estimate), model compensation techniques and robust statistics. Examples of front-end techniques, which normally require less intensive computational effort, include methods based on Mel Frequency Cepstral Coefficients (MFCC), Linear Predictive Coding and Perceptive Linear Predictive Coding. In particular, MFCC-based techniques require spectral power estimation for the speech signals and power spectrum envelope detection. Additive noise more seriously affects regions of low spectral power density (valleys) rather than regions of high spectral power density (peaks), and signal-to-noise ratio is poor in valleys. For this reason, non-linear processing is used for the purpose of noise suppression in power spectrum valleys.

It would be desirable to further adapt existing techniques to more closely simulate the human aural system, thereby effectively exploiting information associated with speech signals.

BRIEF SUMMARY OF THE INVENTION

An automatic speech recognition method and an automatic speech recognition apparatus is provided that effectively exploits information associated with speech signals.

According to one embodiment, an automatic speech recognition method comprises converting an acoustic signal into a digital signal; determining a power spectrum of at least one portion of the digital signal; and non-linearly determining envelope values of the power spectrum at a plurality of respective frequencies, based on a combination of the power spectrum with a filter function; wherein non-linearly determining envelope values comprises calculating each envelope value based on a respective number of values of the power spectrum and of the filter function and said respective number of values is correlated to the respective frequency of the envelope value.

According to another embodiment, an automatic speech recognition apparatus comprises an input module for receiving an acoustic signal and converting the acoustic signal into a digital signal; a spectral power estimation block for determining a power spectrum of at least one portion of the digital signal; and a smoothing block for non-linearly determining envelope values of the power spectrum at a plurality of respective frequencies, based on a combination of the power spectrum with a filter function; wherein the smoothing block is configured to calculate each envelope value based on a respective number of values of the power spectrum and of the filter function, said respective number of values being correlated to the respective frequency of the envelope value.

According to yet another embodiment, a vocal control system comprises an automatic speech recognition apparatus for providing output messages in response to vocal commands imparted by a user, the automatic speech recognition apparatus comprising: an input module for receiving an acoustic signal and converting the acoustic signal into a digital signal; a spectral power estimation block for determining a power spectrum of at least one portion of the digital signal; and a smoothing block for non-linearly determining envelope values of the power spectrum at a plurality of respective frequencies, based on a combination of the power spectrum with a filter function; wherein the smoothing block is configured to calculate each envelope value based on a respective number of values of the power spectrum and of the filter function, said respective number of values being correlated to the respective frequency of the envelope value.

BRIEF DESCRIPTION OF THE SEVERAL VIEWS OF THE DRAWINGS

For the understanding of the present invention, some embodiments thereof will be now described, purely as examples, with reference to the enclosed drawings, wherein.

DETAILED DESCRIPTION OF THE INVENTION

Figure 1:
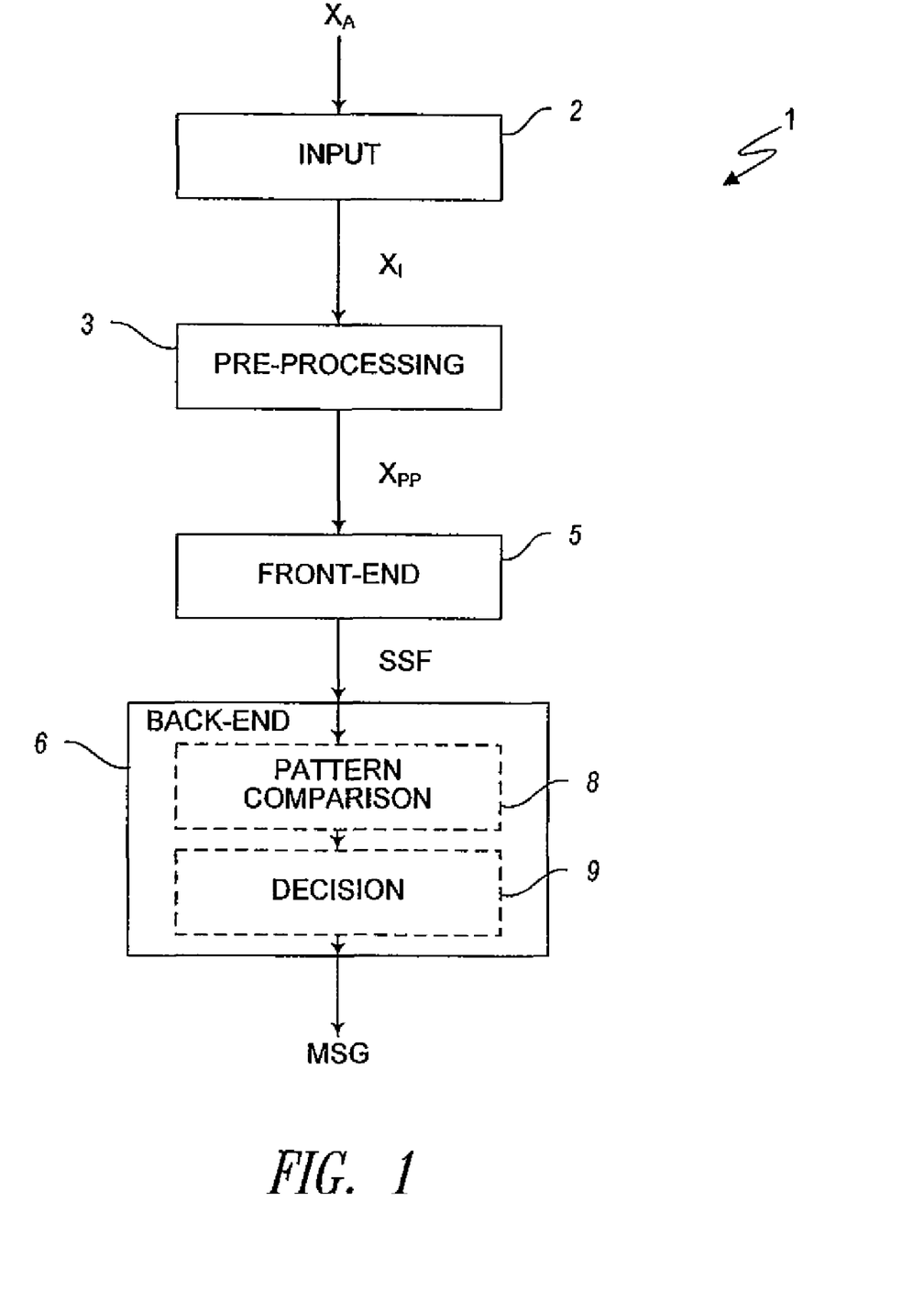
FIG. 1 is a simplified block diagram of an automatic speech recognition apparatus according to a first embodiment of the present invention.

In FIG. 1, an Automatic Speech Recognition (ASR) apparatus is indicate by the reference number 1 as a whole.

The ASR apparatus 1 comprises an input module 2, a pre-processing module 3, a front-end module 5 and a back-end module 6, cascade-connected to one another.

The input module 2 comprises one or more acoustic sensors, for converting acoustic signals $X_A$, generated by a human or synthetic speaker, into corresponding electrical speech signals $X_I$. In particular, the input module 2 may comprise a microphone or an array of microphones having a known spatial configuration.

The pre-processing module 3 receives the speech signals $X_I$ and is configured to carry out a preliminary processing step that comprises at least analog-to-digital conversion and may also include other operations, such as modeling by Hidden Markov Model and beamforming. A digital pre-processed speech signal $X_{PP}$ is output by the pre-processing module 3 and supplied to the front-end module 5.

In another embodiment, the pre-processing module 3 is not included.

The front-end module 5 further processes the pre-processed speech signal $X_{PP}$ (or the speech signal $X_I$, if the pre-processing module 3 is not present) to extract signal speech features SSF for speech recognition, as will be explained later on. In particular, signal speech features SSF include a plurality of Mel Frequency Cepstral Coefficients (MFCC) that are extracted and supplied to the back-end module 6.

The back-end module 6 in turn comprises a pattern comparison block 8 and decision block 9. The extracted signal speech features SSF are compared to a set of patterns in the pattern comparison block 8 and the result is provided to the decision block 9, which selects a word or a sequence of words from a given dictionary for association to the originally received speech signal $X_I$. Selection may be carried out on the basis of a maximum likelihood criterion. The selected word or sequence of words forms an output message MSG, that is made available for further processing downstream of the ASR apparatus 1.

Figure 2:
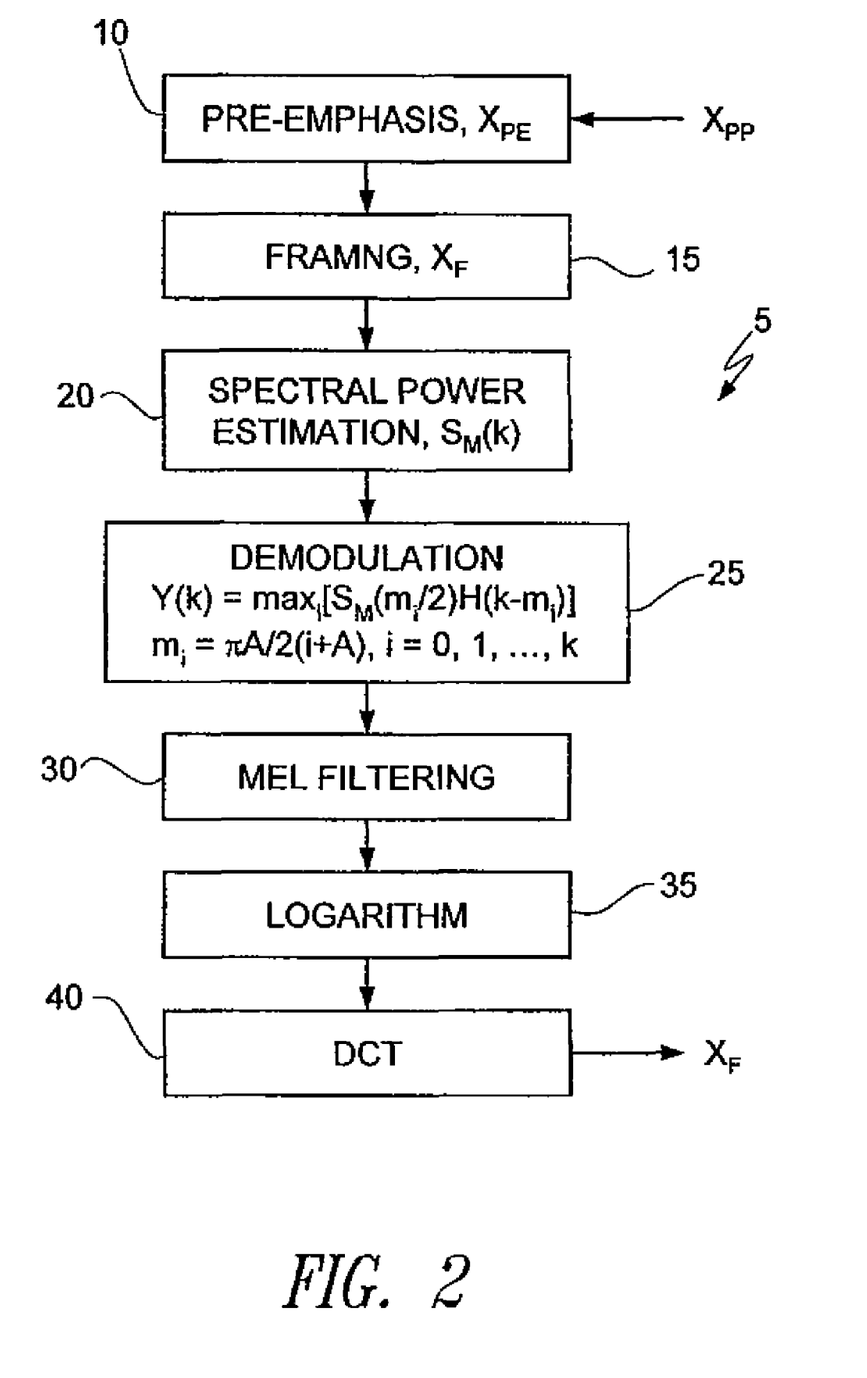
FIG. 2 is a more detailed block diagram of a portion of the apparatus of FIG. 1.

Operation of the front-end module 5 will now be described in detail, with reference to FIG. 2.

A high-pass filter is initially applied to the pre-processed signal $X_{PP}$ in a pre-emphasis block 10, in order to reduce low-frequency components and emphasize high-frequency components. In speech signals, in fact, most information is associated with high-frequency components, whereas low-frequency components may be eliminated without any substantial loss of information. Pre-emphasized signals $X_{PE}$ are thus created.

Figure 3:
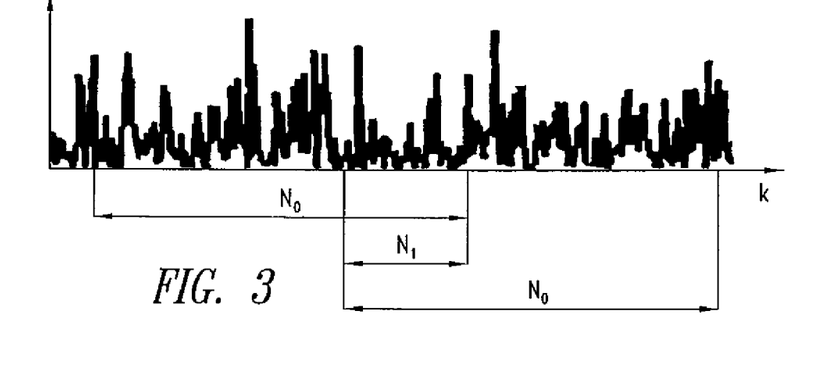
FIG. 3 is a graph showing a plot of quantities relating to the apparatus of FIG. 1.

After high-pass filtering, in a framing block 15 pre-emphasized signals $X_{PE}$ are divided into overlapping signal frames $X_F$, which are then window-filtered. More precisely, signal frames $X_F$ include a number $N_0$ of consecutive samples (e.g., 400) and adjacent signal frames $X_F$ overlap by a number $N_1$ of samples (the number $N_1$ obviously being smaller than the number $N_0$, e.g., $N_1$=200; see also FIG. 3). Then, a window function is applied to each signal frame $X_F$. In the embodiment herein described, a Hamming window is used. In other embodiments, other kinds of window functions may be used, such as triangular window, Welch window, Blackmann window, Harris window.

Signal frames $X_F$ are then completed with a number $N_2$ of null samples. The number $N_2$ is selected so that a total number of samples $N_S$=$N_0$+$N_2$ of each signal frame $X_F$ is suitable for performing the Fast Fourier Transform (FFT) algorithm (e.g., $N_S$=$N_0$+$N_2$=512).

In a spectral power estimation block 20, power spectra $S_M(k)$ (It designates power spectrum associated with a generic M-th frame and k is a discrete frequency) of individual signal frames $X_F$ are determined by first performing FFT algorithm to each signal frame $X_F$ and then calculating the squared absolute value of complex elements obtained through FFT for each signal frame $X_F$.

Then, power spectra $S_M(k)$ are smoothed in a smoothing block 25, by applying a non-linear envelope detection procedure as hereinafter described.

Smoothing is obtained by combining each power spectrum $S_M(k)$ with a low-pass smoothing filter $H(j)$. In the embodiment herein described, the smoothing filter $H(j)$ is a cosine filter and is defined as:

$$H(j)=\cos j,\ 0\leq j\leq \pi/2 \qquad (1a)$$

$$H(j)=0,\ j<0;\ j>\pi/2 \qquad (1b)$$

However, it is understood that any function which defines a low-pass filter could be used in place of the cosine filter.

Smoothing is performed with the twofold purpose of reducing the contribution associated with spectrum valleys (where the power spectrum $S_M(k)$ is lower) and adapting selectivity of envelope detection to better comply with configuration of MEL filterbank that will be subsequently used. Thereby, it is possible to closely simulate frequency discrimination of the human aural system that is greater at lower frequencies and smaller at higher frequencies. In the embodiment described, smoothing is based on the following relations:

$$Y(k)=\max_i[S_M(m_i/2)H(k-m_i)] \qquad (2a)$$

$$m_i=\pi A/2(i+A),\ i=0, 1, \ldots, k \qquad (2b)$$

where $Y(k)$ is the detected envelope and A is a tuning parameter. In one embodiment, parameter A is an integer number ranging from 2 to 16.

According to equations (2a) and (2b), a single value of $m_i$ is used to determine the envelope $Y(k)$ for $k=0$:

$$m_0=\pi/2 \qquad (3a)$$

$$Y(0)=S_M(\pi/4)H(-\pi/2) \qquad (3b)$$

(note that $Y(0)=0$ in any case, when a cosine filter is used for the smoothing filter, as in the embodiment herein described; however, in other embodiments different smoothing filters may be used and $Y(0)$ may have a nonzero value).

As k (frequency) increases, the number of usable values of $m_i$ also increases. For example, for $k=1$:

$$m_0=\pi/2;\ m_1=\pi A/2(1+A) \qquad (4a)$$

$$Y(1)=\max[S_M(\pi/4)H(-\pi/2),$$

$$S_M(\pi A/4(1+A))H(1-\pi A/2(1+A)] \qquad (4b)$$

In practice, if a frequency $k_1$ associated with a first envelope value $Y(k_1)$ is greater than a frequency $k_2$ associated with a second envelope value $Y(k_2)$, the first envelope value $Y(k_1)$ is calculated based on a greater number of values of the power spectrum $S_M(k)$ and of the smoothing filter $H(j)$ than the second envelope value $Y(k_2)$. In this manner, a finer spanning of the smoothing filter $H(j)$ is achieved as frequency k increases and the detected envelope $Y(k)$ is smoother at higher values than at lower values of frequency k.

The tuning parameter A is selectable in a range and allows to adjust selectivity of envelope detection.

Figure 4A:
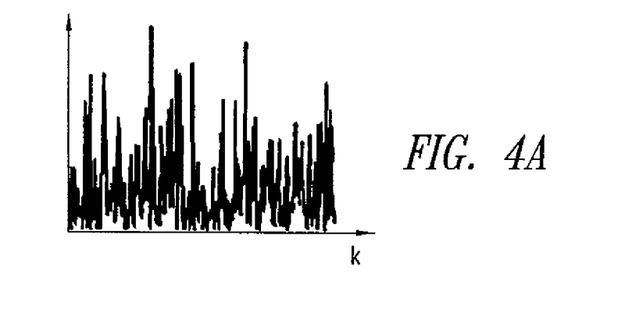
FIG. 4A is a graph showing a plot of quantities relating to the apparatus of FIG. 1.
Figure 4B:
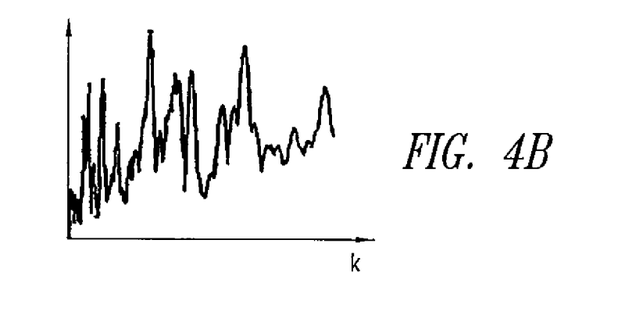
FIG. 4B is a graph showing a plot of quantities relating to the apparatus of FIG. 1 and obtained by a first processing of the quantities illustrated in the graph of FIG. 4A.
Figure 4C:
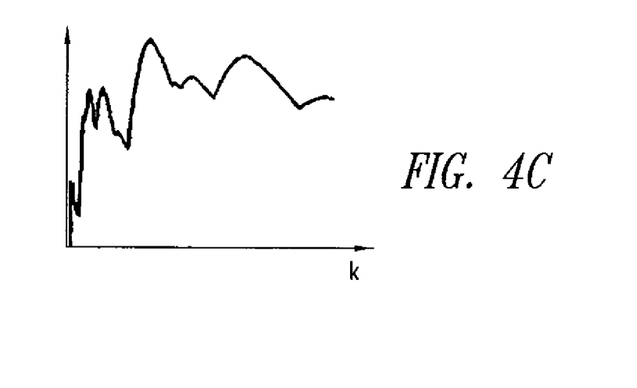
FIG. 4C is a graph showing a plot of quantities relating to the apparatus of FIG. 1 and obtained through a second processing of the quantities illustrated in the graph of FIG. 4A.

By way of example, FIGS. 4A-4C respectively show the power spectrum $S_M(k)$ of a signal frame $X_F$, a first envelope $Y'(k)$, determined through a first (lower) value of the tuning parameter A, and a second envelope $Y''(k)$, determined through a second (higher) value of the tuning parameter A. The first envelope $Y'(k)$ follows variations of the power spectrum $S_M(k)$ more closely than the second envelope $Y''(k)$. In both cases, however, envelopes $Y'(k)$ and $Y''(k)$ adhere more strictly to the power spectrum $S_M(k)$ for low values of k and become smoother as k increases.

At the end of smoothing, $N_S$ values of the envelope $Y(k)$ for each signal frame $X_F$ have been determined.

In a MEL filtering block 30, detected envelopes $Y(k)$ are supplied to a MEL filterbank 32 (see FIG. 5) to extract a number $N_M$ of MEL coefficients. In the embodiment herein described, MEL filterbank 32 includes twenty six partially overlapping triangular filters 33, having respective central frequencies (thus, $N_M=26$ MEL coefficients are extracted). Nevertheless, MEL filterbank with a different number of filters may be used. The higher the central frequencies of triangular filters 33, the greater the bandwidth associated thereto.

In a logarithm block 35, the logarithm operator is applied to MEL coefficients of each signal frame $X_F$, and then, in a DCT block 40, discrete cosine transform (DCT) is determined. Finally, after logarithm calculation and discrete cosine transform, the first (lowest) $N_M/2$ coefficients are selected and provided as Mel Frequency Cepstral Coefficients for back-end processing.

As above explained, non-linear envelope detection is adapted to account for MEL filterbanks structure and, in combination therewith, to simulate human aural system behavior, so that information contained in a speech signal may be effectively captured and processed for the purpose of automatic speech recognition. Considerable noise suppression may be obtained and recognition rate is improved.

Figure 5:
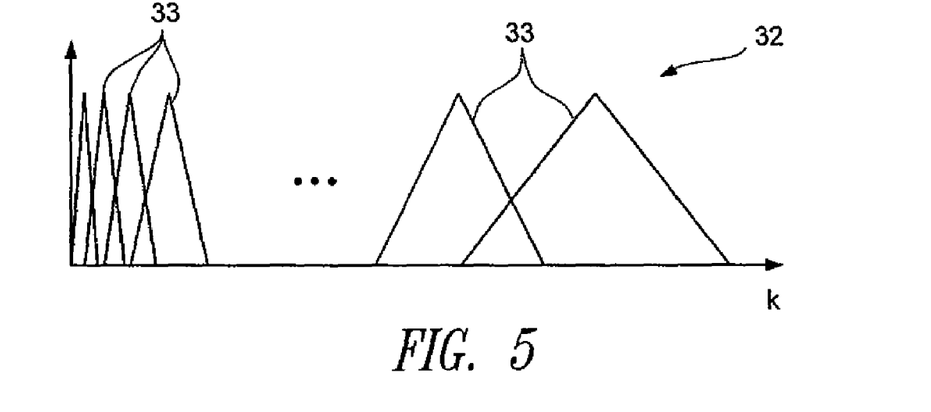
FIG. 5 is a graph showing transfer functions of filters incorporated in the apparatus of FIG. 1.

Adaptation of non-linear envelope detection is achieved by considering a number of samples that is correlated with the discrete frequency k. More precisely, calculation of envelope $Y(k)$ is based on a number of samples of the power spectra $S_M(k)$ that progressively grows as the discrete frequency k increases. Progressive smoothing of envelope $Y(k)$ may be thus achieved in accordance with the structure of the MEL filterbank 32.

Figure 6:
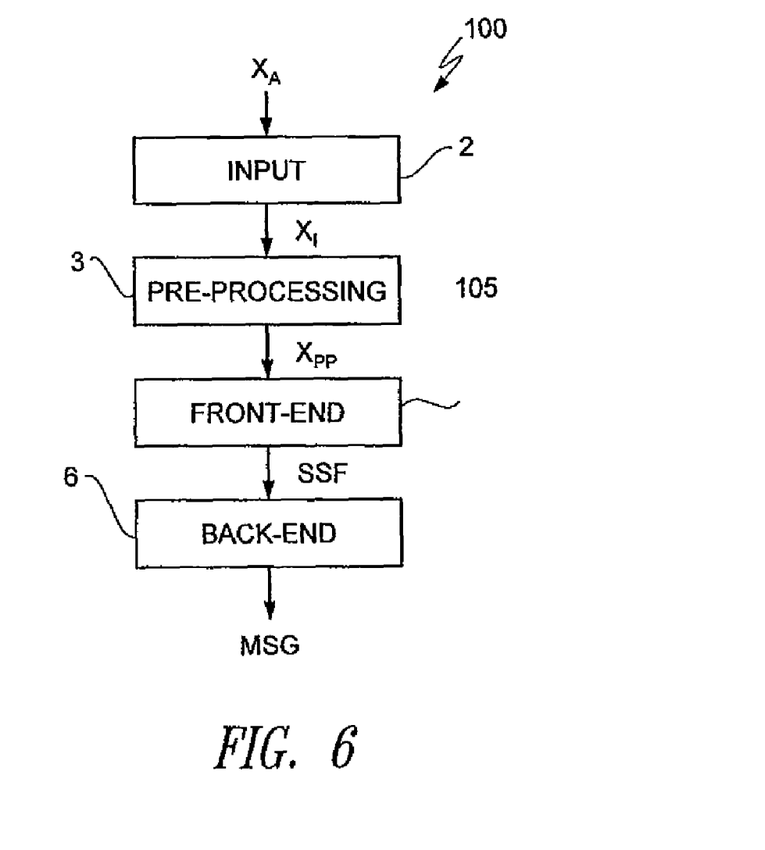
FIG. 6 is a simplified block diagram of an automatic speech recognition apparatus according to a second embodiment of the present invention.
Figure 7:
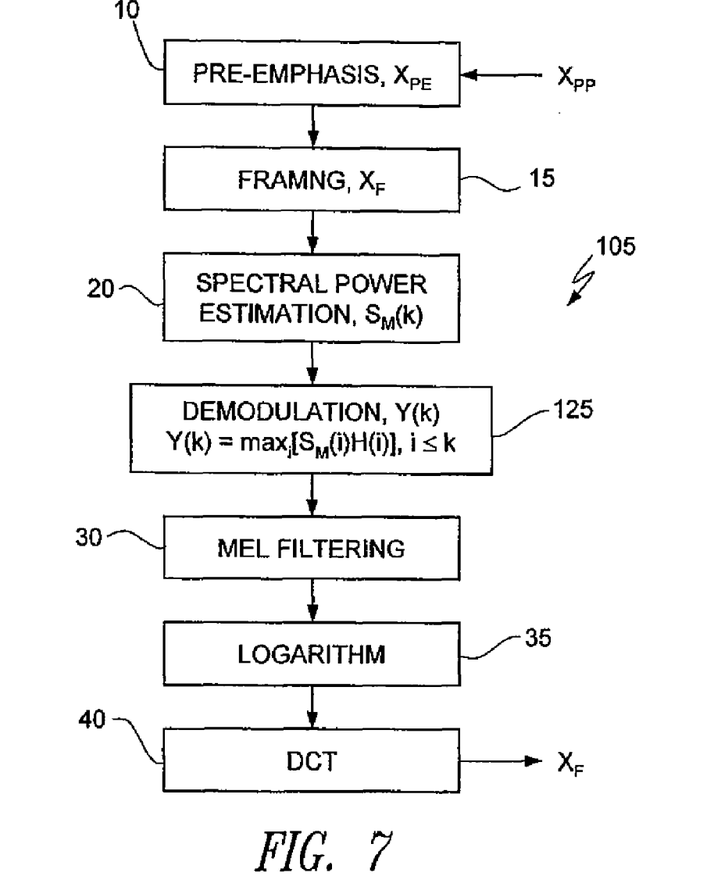
FIG. 7 is a more detailed block diagram of a portion of the apparatus of FIG. 6.

FIGS. 6 and 7, where parts already illustrated are designated by the same reference numbers, show an ASR apparatus 100 that includes the input module 2, the pre-processing module 3 a front-end module 105 and the back-end module 6.

The front-end module 105 (FIG. 7) comprises the pre-emphasis block 10, the framing block 15, the spectral power estimation block 20, a smoothing block 125, the MEL filtering block 30, the logarithm block 35 and the DCT block 40.

The smoothing block 125 is configured to determine the envelope $Y(k)$ of the power spectra $S_M(k)$ provided by the spectral power estimation block 20 according to the following equation:

$$Y(k) = \max_i [S_M(i)H(i)], \quad i \leq k \leq N_M \quad (5)$$

where $N_M$ is the number of filters 33 of the MEL filterbank 32 used in the MEL filtering block 30 (see FIG. 5 in this respect).

Also in this case, the number of samples of the power spectra $S_M(k)$ that are used to calculate the envelope $Y(k)$ progressively increases as the discrete frequency k increases. The effect of progressive smoothing of the envelope $Y(k)$ is thus achieved, as already described, and, in addition, lighter calculation is required.

Figure 8:
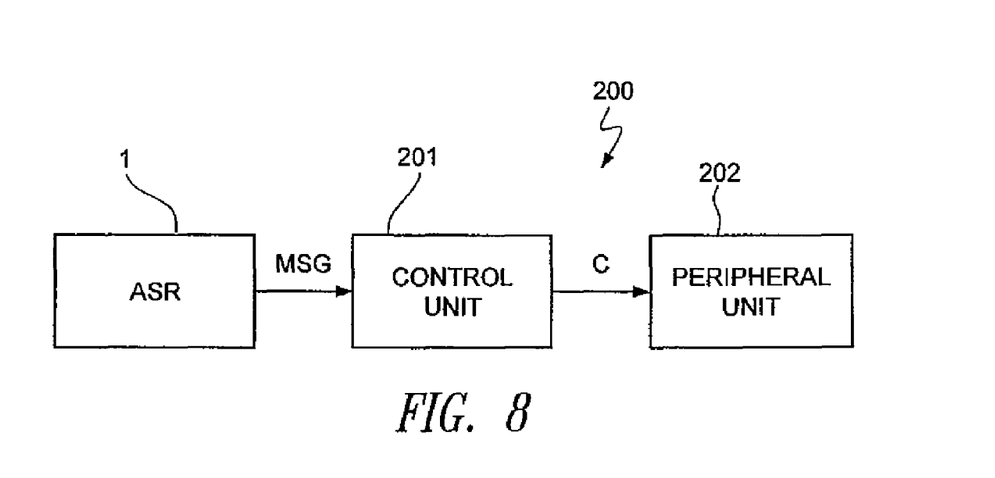
FIG. 8 is simplified block diagram of a vocal control system incorporating an automatic speech recognition apparatus according to an embodiment off the present invention.

FIG. 8 shows a voice control system 200 including the ASR apparatus 1, a control unit 201, coupled to the ASR apparatus 1 for receiving output messages MSG, and a peripheral unit 202, controlled by the control unit 201. The ASR apparatus 1 provides output messages MSG in response to vocal commands imparted by a user. Output messages MSG are used by the control unit 201 to produce control signals C for the peripheral unit 202.

The peripheral unit 202 may comprise any actuator device or software modules, depending on the use the voice control system 200 is designed for.

For example, the voice control system 200 may include a portable phone. In this case, the peripheral unit 202 may comprise a module for selecting phone numbers stored in a memory, a dialing device and a transmitter-receiver device.

In another embodiment, the voice control system 200 may include a computer and the peripheral unit 202 may comprise a word processing module.

In another embodiment, the voice control system 200 may include household appliances (e.g., washer, oven, Hi-Fi system, TV) or household facilities (such as a lighting system). In this case, the peripheral unit 202 may comprise motors, heating devices, electric or electronic circuits, firmware and software modules.

In a further embodiment, the voice control system 200 may be integrated in a vehicle for the purpose of providing hands-free control of some functions without diverting driver's attention. The peripheral unit 202 may comprise, for example, on-board computer, car-stereo system, satellite navigator, cruise control and the like.

Finally, it is clear that numerous modifications and variations may be made to the device and the method described and illustrated herein, all falling within the scope of the invention, as defined in the attached claims.

The invention claimed is:

1. An automatic speech recognition method, the method comprising:
   converting an acoustic signal into a digital signal;
   determining a power spectrum of at least one portion of the digital signal;
   non-linearly determining envelope values of the power spectrum at a plurality of respective frequencies, based on a combination of the power spectrum with a filter function, the non-linearly determining being performed by at least one of a configured automatic speech recognition apparatus and a configured computer;
   wherein non-linearly determining envelope values comprises calculating each envelope value based on a respective number of values of the power spectrum and of the filter function and said respective number of values is correlated to the respective frequency of the envelope value.

2. A method according to claim 1 wherein the number of values is correlated to the frequency such that, if a first frequency associated with a first envelope value $Y(k_1)$ is greater than a second frequency associated with a second envelope value $Y(k_2)$, the number of values for calculating the first envelope value $Y(k_1)$ is greater than number of values for calculating the second envelope value $Y(k_2)$.

3. A method according to claim 1 wherein envelope values are calculated according to the following equations:

$$Y(k)=\max_i[S_M(m_i/2)H(k-m_i)]$$

$$m_i=\pi A/2(i+A), i=0, 1, \ldots, k$$

where $Y(k)$ are the envelope values, $S_M(m_i)$ is the power spectrum, $H(k-m_i)$ is the filter function and A is a tuning parameter.

4. A method according to claim 1 wherein envelope values are calculated according to the following equation:

$$Y(k)=\max_i[S_M(i)h(i)], i \leq k$$

where $Y(k)$ are the envelope values, $S_M(i)$ is the power spectrum and $H(k-m_i)$ is the filter function.

5. A method according to claim 1, wherein the filter function is a low-pass filter function.

6. A method according to claim 5 wherein the filter function is a cosine filter function.

7. A method according to claim 1, further comprising extracting a set of Mel Frequency Cepstral Coefficients associated with the least one portion of the digital signal, based on the envelope values.

8. A method according to claim 7 wherein extracting a set of Mel Frequency Cepstral Coefficients comprises filtering the envelope values with a MEL filterbank.

9. A method according to claim 1, further comprising dividing the digital signal into a plurality of signal frames.

10. A method according to claim 9, further comprising window-filtering the signal frames.

11. The method of claim 1, further comprising extracting speech features based on the envelope values.

12. The method of claim 11, further comprising:
comparing the speech features to patterns; and
selecting one or more words from a dictionary based on the comparing.

13. An automatic speech recognition apparatus comprising:
an input module for receiving an acoustic signal and converting the acoustic signal into a digital signal;
a spectral power estimation block for determining a power spectrum of at least one portion of the digital signal; and
a smoothing block for non-linearly determining envelope values of the power spectrum at a plurality of respective frequencies, based on a combination of the power spectrum with a filter function;
wherein the smoothing block is configured to calculate each envelope value based on a respective number of values of the power spectrum and of the filter function, said respective number of values being correlated to the respective frequency of the envelope value.

14. An apparatus according to claim 13 wherein the smoothing block is configured to correlate the number of values to the frequency such that, if a first frequency associated with a first envelope value $Y(k_1)$ is greater than a second frequency associated with a second envelope value $Y(k_2)$, the number of values for calculating the first envelope value $Y(k_1)$ is greater than number of values for calculating the second envelope value $Y(k_2)$.

15. An apparatus according to claim 13 wherein envelope values are calculated according to the following equations:

$$Y(k)=\max_i[S_M(m_i/2)H(k-m_i)]$$

$$vm_i=\pi A/2(i+A), i=0, 1, \ldots, k$$

where $Y(k)$ are the envelope values, $S_M(m_i)$ is the power spectrum, $H(k-m_i)$ is the filter function and A is a tuning parameter.

16. An apparatus according to claim 13 wherein envelope values are calculated according to the following equation:

$$Y(k)=\max_i[S_M(i)h(i)], i \leq k$$

where $Y(k)$ are the envelope values, $S_M(m_i)$ is the power spectrum and $H(k-m_i)$ is the filter function.

17. An apparatus according to claim 13, further comprising a MEL filterbank for filtering the envelope values.

18. A vocal control system comprising:
an automatic speech recognition apparatus for providing output messages in response to vocal commands imparted by a user, the automatic speech recognition apparatus comprising:
an input module for receiving an acoustic signal and converting the acoustic signal into a digital signal;
a spectral power estimation block for determining a power spectrum of at least one portion of the digital signal; and
a smoothing block for non-linearly determining envelope values of the power spectrum at a plurality of respective frequencies, based on a combination of the power spectrum with a filter function;
wherein the smoothing block is configured to calculate each envelope value based on a respective number of values of the power spectrum and of the filter function, said respective number of values being correlated to the respective frequency of the envelope value.

19. A system according to claim 18, further comprising:
a control unit; and
a peripheral unit controlled by the control unit, wherein the control unit is coupled to the automatic speech recognition apparatus for receiving output messages and for producing control signals for the peripheral unit, based on the output messages.

20. The vocal control system of claim 19 wherein the peripheral unit is a unit of a portable telephone.

21. The vocal control system of claim 19 wherein the peripheral unit is a unit of a vehicle.

22. The vocal control system of claim 19 wherein the peripheral unit is a unit of a household appliance.

23. A non-transitory computer-readable medium whose contents contain instructions that, when executed, configure a computer to perform a method comprising:
determining a power spectrum of at least one portion of a digital signal; and
non-linearly determining envelope values of the power spectrum at a plurality of respective frequencies, based on a combination of the power spectrum with a filter function, the non-linearly determining envelope values of the power spectrum at a plurality of respective frequencies including calculating each envelope value based on a respective number of values of the power spectrum and of the filter function and said respective number of values is correlated to the respective frequency of the envelope value.

24. The computer-readable medium of claim 23 wherein the number of values is correlated to the frequency such that, if a first frequency associated with a first envelope value $Y(k_1)$ is greater than a second frequency associated with a second envelope value $Y(k_2)$, the number of values for calculating the first envelope value $Y(k_1)$ is greater than number of values for calculating the second envelope value $Y(k_2)$.

25. The computer-readable medium of claim 23 wherein envelope values are calculated according to the following equations:

$$Y(k) = \max_i [S_M(m_i/2) H(k-m_i)]$$

$$m_i = \pi A/2(i+A), i=0, 1, \ldots, k$$

where $Y(k)$ are the envelope values, $S_M(m_i)$ is the power spectrum, $H(k-m_i)$ is the filter function and $A$ is a tuning parameter.

26. The computer-readable medium of claim 23 wherein envelope values are calculated according to the following equation:

$$Y(k) = \max_i [S_M(i) h(i)], i \leq k$$

where $Y(k)$ are the envelope values, $S_M(i)$ is the power spectrum and $H(k-m_i)$ is the filter function.

27. The computer-readable medium of claim 23, further comprising extracting speech features based on the envelope values.

28. The computer-readable medium of claim 27, further comprising:
   comparing the speech features to patterns; and
   selecting one or more words from a dictionary based on the comparing.

* * * * *

UNITED STATES PATENT AND TRADEMARK OFFICE
CERTIFICATE OF CORRECTION

| | | |
|---|---|---|
| PATENT NO. | : 7,877,252 B2 | Page 1 of 1 |
| APPLICATION NO. | : 11/750771 | |
| DATED | : January 25, 2011 | |
| INVENTOR(S) | : Luigi Arnone et al. | |

It is certified that error appears in the above-identified patent and that said Letters Patent is hereby corrected as shown below:

Title Page, Item 56
"Giuliani, D. et al., "Experiments of Speech Recognition in a Noisy and Reverberant Environment using a Microphone Array and HMM Adaption," Proceedings of the Fourth International Conference on Spoken Language, Philadelphia, PA, Oct. 3-6, 1996, pp. 1329-3332." should read as, --Giuliani, D. et al., "Experiments of Speech Recognition in a Noisy and Reverberant Environment using a Microphone Array and HMM Adaption," Proceedings of the Fourth International Conference on Spoken Language, Philadelphia, PA, Oct. 3-6, 1996, pp. 1329-1332.--.

Column 8
Claim 16, Line 5, "where Y(k) are the envelope values, $S_M(m_i)$ is the power" should read as, --where Y(k) are the envelope values, $S_M(i)$ is the power--.

Signed and Sealed this
Twenty-second Day of March, 2011

David J. Kappos
*Director of the United States Patent and Trademark Office*